United States Patent [19]

Bühler et al.

[11] Patent Number: 4,795,807

[45] Date of Patent: Jan. 3, 1989

[54] PREPARATION OF AZO DYESTUFFS BY DIAZOTIZATION AND COUPLING IN THE PRESENCE OF AN ESTER

[75] Inventors: Ulrich Bühler, Alzenau; Friedrich Schophoff; Wolf Weidemüller, both of Frankfurt, all of Fed. Rep. of Germany

[73] Assignee: Cassella Aktiengesellschaft, Frankfurt am Main, Fed. Rep. of Germany

[21] Appl. No.: 31,530

[22] Filed: Mar. 30, 1987

[51] Int. Cl.$^4$ .................. C09B 41/00; C09B 67/48; C09B 67/54

[52] U.S. Cl. .................. 534/58; 534/575; 534/582; 534/583; 534/735; 534/753; 534/771; 534/772; 534/773; 534/787; 534/792; 534/795; 534/850; 534/856; 534/887

[58] Field of Search .................. 534/581, 565

[56] References Cited

U.S. PATENT DOCUMENTS

| | | | |
|---|---|---|---|
| 3,081,314 | 3/1963 | Goel et al. | 534/581 X |
| 3,325,470 | 6/1967 | Ribka | 534/581 X |
| 3,900,459 | 8/1975 | Kawamura et al. | 534/581 |
| 4,207,233 | 6/1980 | Seybold et al. | 534/581 X |
| 4,376,730 | 3/1983 | De Graaf | 534/581 |

FOREIGN PATENT DOCUMENTS

| | | | |
|---|---|---|---|
| 1544463 | 6/1971 | Fed. Rep. of Germany | 534/581 |
| 2901861 | 7/1980 | Fed. Rep. of Germany | 534/581 |

*Primary Examiner*—Floyd D. Hegel
*Attorney, Agent, or Firm*—Connolly and Hutz

[57] ABSTRACT

Azo disperse dyestuffs are prepared by diazotization and coupling in an aqueous phase, the coupling being carried out in the presence of an ester of a lower aliphatic carboxylic acid.

8 Claims, No Drawings

PREPARATION OF AZO DYESTUFFS BY DIAZOTIZATION AND COUPLING IN THE PRESENCE OF AN ESTER

The invention relates to a process for the preparation of azo dyestuffs by diazotization and coupling.

The process of diazotization and coupling is of paramount importance for the manufacture of azo dyestuffs. This process is in most cases carried out in two stages. First, in the diazotization stage, a diazotizable aromatic or hetero-aromatic amine, in the presence of aqueous mineral acid, is converted into a solution or suspension of a diazonium salt in a mineral acid, for example by the action of nitrous acid produced in situ. In the second stage, the coupling, the aqueous solution or suspension of the diazonium salt is combined with the aqueous solution of the coupling component. In general, this is effected by running the solution or suspension of the diazonium salt in mineral acid into the aqueous solution of the coupling component. In most cases, the optimum pH in the particular case is maintained by adding bases, such as, for example, alkali metal hydroxides, alkali metal carbonates, ammonia, calcium carbonate, magnesium oxide and the like, or by adding buffer substances.

In the case of disperse dyestuffs, that is to say azo dyestuffs sparingly soluble in water, when the coupling is complete, a suspension of the dyestuff in water is available, and the dyestuff is filtered off from this.

What is expected from a good manufacturing process in this regard is not only a high space/time yield and a high yield of dyestuff, with a high degree of purity, but also that, when the coupling is complete, the dyestuff shall be in the form of a readily filterable product. In addition, this product should, after filtration, yield a filter cake having as high a content of paste as possible.

The advantages of ready filterability in this case are, for example, short filtration and washing times, low amounts of wash water and effluent, a low volume of filter cake and good washingoff properties in the filter cake and hence a fairly high content of pure dyestuff. If the paste content is adequately high, it is possible to dispense with expensive drying of the paste for further processing.

An improvement in the filterability and an increase in the paste content is usually achieved by heating the mixture after coupling, in the course of which a coarsening of the dyestuff crystals or a change in crystal form takes place. However, the high temperatures required for this process result to a varying extent, in the acid medium, in destruction of the dyestuff with scission of the azo structure and/or in the saponification of acid-labile groups, which causes a reduction in the yield and/or the purity. Attempts are made to counter this by neutralizing the mixture before heating. Large amounts of salt are then formed, however, and these constitute pollution of the effluent. In addition, when neutralization is carried out, it is necessary to absorb the heat of neutralization by adding ice and/or to keep the salt formed in solution before filtration by adding water, which reduces the volume yield.

It is also possible to counter the destruction of the dyestuff by diluting the coupling mixture very considerably with water before heating. This procedure also reduces the volume yield and to a considerably greater extent.

When certain azo dyestuffs which can only be prepared with difficulty by the normal method of diazotization and coupling in water are prepared, it is also known to carry out the diazotization and coupling in mixtures of water and water-miscible organic solvents. Lower alcohols, above all, are used as solvents of this type, cf., for example U.S. Pat. Nos. 2,824,096, 3,040,019, 3,218,309 and 3,352,845, German Offenlegungsschriften Nos. 2,048,839 and 2,509,560, and German Auslegeschrift No. 2,139,311. It is also known in this regard to use a two-phase mixture of water and an aliphatic alcohol having a chain length of 4 to 6 C-atoms, cf. German Auslegeschrift No. 2,603,836.

Processes in which the coupling is carried out in an aqueous two-phase system or in an anhydrous organic medium in the presence of aliphatic carboxylic acids are disclosed in German Offenlegungsschriften Nos. 3,229,413 and 3,238,907 for the selective ortho-coupling of diazo components with 1-naphthol or 1-naphthylamine, respectively. The water-immissible organic solvents used here are, for example, benzene, toluene, nitrobenzene, chlorobenzene, chloroform and tetrachloroethylene. In these processes, the diazonium compound is preferably employed in the form of a solid diazonium salt, for example as the tetrafluoroborate or zinc double salt. The solvent is removed by distillation when coupling is complete.

German Offenlegungsschrift No. 1,927,453 discloses a process for the preparation of metal-free azo pigments in which the diazotization is carried out without isolating the diazo compound, and the coupling is carried out in a heterogeneous phase, the diazo component and/or the coupling component being in suspension in organic solvents containing not more than 10% of water, and the azo pigments being conditioned, if appropriate, by a heat treatment employing high-boiling organic solvents. Examples of solvents used are benzene, toluene, o-dichlorobenzene, tetrachloroethane, petroleum hydrocarbons, nitrobenzene, chloroform, glacial acetic acid or methanol.

German Offenlegungsschrift No. 2,312,421 discloses a process for the preparation of azo pigments in which a solution or partial dispersion of the diazo component in a hydrophobic organic solvent is mixed and reacted with a solution or partial dispersion of a coupling component in a hydrophobic organic solvent. Examples of hydrophobic organic solvents indicated in this regard are benzene, naphthalene, biphenyl, 2-chloronaphthalene, toluene, nitrobenzene, nitrotoluene, anisole, acetophenone, ligroin, tetralin, butyl acetate or amyl acetate. After the coupling reaction, it is possible to carry out a purification and crystallization of the pigment by heating the reaction mixture. It is preferable to employ aromatic solvents and, in particular, those having a boiling point above 150° C., since they are, for example, extremely effective for the crystallization process after the coupling reaction. It is particularly advantageous to employ monochlorobenzene, dichlorobenzene, trichlorobenzene, tetrachlorobenzene, nitrobenzene, nitrotoluene or nitrochlorobenzene. They can, for example, also contain water in amounts less than 30% by weight.

The Derwent Report of JA-58 160,355-A discloses that monoazo dyestuffs can be prepared by diazotizing 4-nitroaniline, which can also be substituted in the 2-position by halogen or methylsulphonyl, and by coupling the product with certain N-substituted aniline derivates. In this process the filterability of the dyestuff is improved by neutralizing the reaction mixture partially or completely, as appropriate, after the coupling and subjecting it to heat treatment in the presence of an organic hydrophobic solvent. The organic hydrophobic solvent used is, for example, benzene, toluene, xylene, 4-methyl-2-pentanone (=MIBK, methyl isobutyl ketone), dichloroethane, dichloroethylene, tetrachloroethylene, monochlorobenzene, dichlorobenzene or nitrobenzene. The organic solvent is removed after the heat treatment by steam distillation or distillation under reduced pressure.

According to the Derwent Abstract of JA 58 160,356-A and 58 160,357-A, this process can also be applied to dyestuffs in which the diazo component consists of certain 2,6-disubstituted 4-nitroanilines or certain 2-cyano-4-nitroanilines.

Fundamentally, heating after coupling means a prolongation of the manufacturing time and also an increase in the expenditure of energy through heating and cooling.

It has now been found, surprisingly, that, in the preparation of azo disperse dyestuffs by diazotization and coupling in an aqueous phase, the filterability of the dyestuff obtained after coupling and the paste content of the filter cake available after filtration can be improved substantially without heat treatment, if the coupling carried out in an aqueous phase is carried out in the presence of an ester of an optionally substituted lower aliphatic carboxylic acid and an optionally substituted aliphatic alcohol.

Within the scope of the present invention, lower aliphatic carboxylic acids are to be understood as meaning those having up to 6 C-atoms. Suitable esters of lower aliphatic carboxylic acids are derived, for example, from optionally substituted aliphatic monocarboxylic acids having 1 to 6 C-atoms or optionally substituted dicarboxylic acids having 2-6 C-atoms and from optionally substituted aliphatic alcohols having 1–10, preferably 1 to 8, C-atoms.

Both the carboxylic acid part and the alcohol part of the carboxylic acid ester can be monosubstituted or polysubstituted, in particular by phenyl, phenoxy, alkoxy, alkoxycarbonyl, alkoxycarbonyloxy, alkoxyalkoxy or methylene. The alkyl or alkoxy radicals involved can have, for example, 1 to 8 C-atoms.

The preferred esters of an optionally substituted lower aliphatic carboxylic acid and an optionally substituted aliphatic alcohol have the general formula I $$R-CO-OR^1 \quad (I)$$

wherein

R denotes H; $-(CH_2)_n-CO-OR^2$; or alkyl which has 1 to 5 C-atoms and which is optionally substituted by $-OR^3$, $-COOR^2$, $-O-CO-R^3$, $-C_6H_5$, $-OC_6H_5$ or $-OH$, $R^1$ and $R^2$ denote alkyl which has 1 to 8 C-atoms and which is optionally substituted by $-OR^4$, $-COOR^4$, $-O-CO-R^4$, $-C_6H_5$, $-OC_6H_5$, $-O-(CH_2)_m-OR^4$ or OH; or

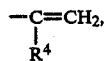

$R^3$ and $R^4$ denote alkyl having 1 to 8 C-atoms,
n denotes 0 to 4 and
m denotes 1 to 4.

The alkyl radicals represented by R, $R^1$ and $R^2$ can be polysubstituted or, preferably, monosubstituted. Unsubstituted alkyl radicals are particularly preferred.

The radicals $R^1$, $R^2$, $R^3$ and $R^4$, or $R^1$ and $R^2$ on the one hand and $R^3$ and $R^4$ on the other hand, can be identical or different. Normally, the radicals $R^1$ and $R^2$ are identical. The alkyl radicals represented by R, $R^1$, $R^2$, $R^3$ and $R^4$ can be linear or branched. Carboxylic acid esters of formula I in which R denotes H, alkyl having 1 to 5 C-atoms or $-(CH_2)_n CO-OR^2$, $R^1$ and $R^2$ denote alkyl having 1 to 8 C-atoms and n denotes 0 to 4 are used in many cases.

Examples of suitable carboxylic acid esters are methyl, ethyl, propyl, isopropyl, butyl, isobutyl, sec.-butyl, pentyl, isoamyl, hexyl, heptyl, benzyl, 3-methoxy-n-butyl, isopropenyl and isooctyl formate, acetate, propionate, butyrate, isobutyrate, valerate, isovalerate, caproate, phenylacetate, glycollate, and dimethyl, diethyl, dipropyl, diisopropyl, dibutyl, diisobutyl, disec.-butyl, dipentyl, diisoamyl, dihexyl, diheptyl, dibenzyl, di-3-methoxy-n-butyl, diisopropenyl and diisooctyl oxalate, malonate, succinate, glutarate and adipate.

Esters of formate, acetic and propionic acid and esters having 3 to 8 C-atoms are preferred. Methyl, ethyl, propyl, isopropyl, butyl, isobutyl, benzyl and isopropenyl acetate or propionate are particularly preferred.

Carboxylic acid esters which are also preferred are those which have a solubility less than 30% by weight, in particular less than 20% by weight and very particularly preferably less than 10% by weight, in water at 20° C. It is, of course, also possible to use a mixture of 2 or more carboxylic acid esters.

In carrying out the process according to the invention, a diazo component is first diazotized in water in a customary manner, and the solution or dispersion of the diazonium compound thus obtained is then combined with an aqueous solution or dispersion of a coupling component, the coupling being carried out in the presence of an ester of the type mentioned. It is preferable to run the solution or dispersion of the diazonium salt into the solution or dispersion of the coupling component. However, the reverse procedure, in which the solution or dispersion of the coupling component is run into the solution or dispersion of the diazonium salt, is also possible. In both procedures the carboxylic acid ester is normally added to the solution or dispersion of the coupling component before the start of the coupling reaction. The carboxylic acid ester can, however, also be added to the solution or dispersion of the diazonium salt or to both the diazo solution or dispersion and the coupling solution or dispersion, before the start of the coupling reaction.

The amount of the carboxylic acid ester to be used is only slight, relative to the size of the batch present when the coupling is complete. Relative to the amount of dyestuff obtained in the coupling reaction, calculated on a dry basis, 0.3 to 150% by weight, preferably 0.5 to 50% by weight and very particularly preferably 1 to 15% by weight, of the carboxylic acid ester are employed in the process according to the invention. It is preferable to add the whole amount of the carboxylic acid ester to the solution or dispersion of the coupling component before the coupling reaction. The carboxylic acid ester can, however, also be added in portions or continuously during the coupling reaction. If a part or the whole amount of the carboxylic acid ester is to be added to the diazo solution or dispersion before the coupling reaction, it is preferable first to dilute the diazo solution or dispersion with water in order to prevent rapid hydrolysis of the carboxylic acid ester. It is also possible to employ more than 150% by weight of carboxylic acid ester, relative to the amount of dyestuff, in the process according to the invention, but this brings no advantages. For economic reasons alone, the amount of carboxylic acid ester added will be kept as small as possible. In many cases not more than 15% by weight, relative to the amount of dyestuff, is adequate. If the amount of carboxylic acid ester to be employed is related, for example, to the amount of water in the coupling solution or dispersion, about 0.5 to 150% by weight, preferably about 1 to 20% by weight, of carboxylic acid ester will be employed in the process according to the invention.

It is preferable to employ a higher percentage of the somewhat more highly water-soluble carboxylic acid esters having 2 to 4 C-atoms than of the less water-soluble carboxylic acid esters having a total of more than 5 C-atoms.

The preparation of the solution or suspension in mineral acid of the diazonium salt which is employed in the process according to the invention is effected, as usual, in such a way that a diazotizable aromatic or heterocyclic amine is reacted with a diazotization agent in an aqueous or concentrated mineral acid. Examples of suitable acids are phosphoric acid and, in particular, hydrochloric acid or sulphuric acid. Examples of diazotization agents are the salts of nitrous acid, in particular the alkali metal salts, such as, for example, sodium nitrite, or substances which evolve nitrous acid, such as, for example, nitrosylsulphuric acid.

In the diazotization, it is customary initially to take the amine to be diazotized in the mineral acid and to meter in the diazotization agent. In special cases, however, it is also possible initially to take the diazotization agent, for example, nitrosylsulphuric acid, and to introduce the amine to be diazotized. The diazotization is carried out at temperatures from $-25°$ to $60°$ C., depending on the solubility and basicity of the amine to be diazotized and depending on the stability of the diazonium compound.

The preparation of the aqueous solution or dispersion of the coupling component is effected by introducing the coupling component into water and stirring it into the solution or distributing it finely. As already mentioned, the carboxylic acid ester to be used is normally added to the aqueous solution or dispersion of the coupling component. However, it is also possible to introduce the coupling component into a mixture of water and carboxylic acid ester. If the coupling component does not dissolve completely in the amount of water or in the water/carboxylic acid ester mixture when the coupling solution is prepared, it can be made to dissolve completely or partially by acidification with an acid, such as, for example, a mineral acid, such as hydrochloric acid, sulphuric acid or phosphoric acid, or a carboxylic acid, such as, for example, acetic acid or propionic acid, or by rendering the mixture alkaline, for example with an alkali metal hydroxide, such as sodium or potassium hydroxide solution, or with an alkaline earth metal hydroxide, such as calcium hydroxide, or with an alkali or alkaline earth metal carbonate, such as sodium carbonate or calcium carbonate. It is preferable to add the acid or base required in this respect before the coupling component is introduced. If the coupling component only dissolves at pH values below 3 or above 10, it is expedient not to add the carboxylic acid ester until immediately before the coupling reaction. However, it is, of course, also possible to use for the coupling reaction a suspension of the coupling component in which the coupling component is only partially dissolved. It is advantageous in this case to distribute the coupling component finely in the aqueous phase, for example by using a serrated stirrer or a pinned disc mill.

The coupling temperature is, in particular, within the range from $-10°$ to $80°$ C., but is preferably below the boiling point of the carboxylic acid ester employed in accordance with the invention, and, depending on the reactivity or solubility of the coupling component and the reactivity of the diazonium compound, is in many cases $-10°$ to $40°$ C., preferably $0°$ to $60°$ C. and very particularly preferably $0°$ to $30°$ C.

Indirect or direct cooling, for example, by adding ice, must be applied when the coupling reaction is carried out.

In order to accelerate the coupling reaction and to absorb the acid supplied, in the coupling reaction, to the coupling mixture through the mineral acid solution of the diazonium compound, or the acid liberated in the course of the coupling reaction, it can be suitable to add, in a manner which is in itself known, a base, in particular an alkali or alkaline earth metal hydroxide, or to buffer the reaction mixture, in order to keep the pH at the optimum value during the coupling reaction. Examples of suitable alkali metal hydroxides are potassium hydroxide solution, or particularly sodium hydroxide solution. Buffer substances are added to the reaction mixture to achieve buffering. Examples of buffer substances are the alkali or alkaline earth metal salts of fairly weak acids, such as, for example, the sodium salts of the acids of phosphorus.

It is suitable to carry out the coupling in a manner which is in itself known in the presence of surface-active substances, which are usually put in initially together with the coupling component. Surface-active substances can have a cationic character and, preferably, a nonionic or anionic character, or they can be mixtures of surface-active substances belonging to the groups mentioned. It is also possible to use mixtures of nonionic and anionic surface-active substances.

Examples of anionic surface-active substances are the condensation products of aromatic sulphonic acids with formaldehyde, ligninsulphonates having an average molecular weight between 1000 and 80,000, dialkyl sulphosuccinates having 3 to 10 C-atoms in each of the alkyl groups, sulphated or sulphonated fatty acids or fatty acid esters having 10 to 22 C-atoms in the fatty acid radical. These anionic surface-active substances are usually in the form of their alkali metal, ammonium or water-soluble amine salts.

Examples of cationic surface-active substances are quaternary alkylammonium halides having at least one $C_{12}$ to $C_{25}$ alkyl radical, and long-chain alkylpyridinium halides.

Examples of nonionic surface-active substances are ethylene oxide adducts belonging to the class of reaction products formed from ethylene oxide and saturated and/or unsaturated fatty alcohols having 6 to 20 C-atoms or alkylphenols having 4 to 12 C-atoms in the alkyl radical or saturated and/or unsaturated fatty amines having 14 to 20 C-atoms or saturated and/or unsaturated fatty acids having 14 to 20 C-atoms or graft polymers formed from ethylene oxide and polypropylene glycol. The surface-active substance or mixture of surface-active substances is preferably employed in an amount of 0.2 to 30% by weight in particular 0.5 to 10% by weight, relative to the amount of dyestuff to be expected.

The diazo and coupling components which are known for the preparation of disperse azo dyestuffs can be employed in the process, according to the invention, for the preparation of dyestuffs of this type. Examples of diazotizable amines which can be employed for the process according to the invention are, in particular, anilines of general formula II

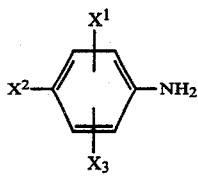
(II)

wherein $X^1$ and $x^2$ denote hydrogen, halogen, alkyl or alkoxy having 1 to 4 C-atoms, nitro, cyano, trifluoromethyl, alkoxycarbonyl, aminocarbonyl, N-monoalkylaminocarbonyl, N,N-dialkylaminocarbonyl, alkylsulphonyl, phenylsulphonyl, phenylsulphonyloxy, aminosulphonyl, N-monoalkylaminosulphonyl, N,N-dialkylaminosulphonyl, N-phenylaminosulphonyl, alkylcarbonyl or benzoyl, $X^3$ denotes hydrogen or halogen, $X^2$ denotes phenylazo, which can be monosubstituted or polysubstituted by halogen, alkyl or alkoxy having 1 to 4 C-atoms, nitro, cyano, trifluoromethyl, alkoxycarbonyl, alkylcarbonyl or alkylsulphonyl, or denotes phenoxy. Further examples or diazotizable amines are 1-naphthylamine which can be monosubstituted or polysubstituted by halogen, alkyl or alkoxy having 1 to 4 C-atoms, nitro or cyano, heterocyclic amines, such as, for example, 2-aminothiazole which can be monosubstituted or polysubstituted by nitro, halogen, alkyl having 1 to 4 C-atoms or optionally substituted phenylazo or phenyl, 2-aminobenzothiazole which can be monosubstituted or polysubstituted by alkyl or alkoxy having 1 to 4 C-atoms, halogen, nitro, cyano, trifluoromethyl, thiocyanato or alkylsulphonyl, 5-aminoisothiazole which can be monosubstituted or polysubstituted by alkyl, alkylthio or alkoxy having 1 to 4 C-atoms, halogen or phenyl, 3-aminobenzisothiazole which can be monosubstituted or polysubstituted by halogen, nitro or cyano, 2-amino-1,3,4-thiadiazole which can be substituted by alkoxy, alkylthio or alkylsulphonyl having 1 to 4 C-atoms, halogen or thiocyanato, 2-amino-1,3,5-thiadiazole which can be substituted by alkoxy or alkylthio having 1 to 4 C-atoms, or 2-aminothiophene which can be substituted by halgen, alkyl having 1 to 4 C-atoms, phenyl, nitro, cyano, alkoxycarbonyl, alkylcarbonyl, benzoyl, monoalkylaminocarbonyl, dialkylaminocarbonyl, alkylsulphonyl, phenylsulphonyl, monoalkylaminosulphonyl, dialkylaminosulphonyl or optionally substituted phenylazo.

The following, in particular, should be mentioned as examples of coupling components which can be employed in the process according to the invention:

(a) anilines of the general formula III

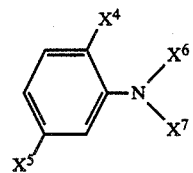
(III)

wherein $X^4$ and $X^5$ independently of one another denote hydrogen, halogen, alkyl or optionally substituted alkoxy having 1 to 4 C-atoms, $X^5$ additionally denotes alkylsulphonylamino or optionally substituted alkylcarbonylamino having 1 to 4 C-atoms in the alkyl group, $X^6$ and $X^7$ independently of one another denote hydrogen, or alkyl which has 1 to 4 C-atoms and is optionally substituted by halogen, cyano, phenyl, hydroxyl, alkoxy, phenoxy, alkylcarbonyloxy, alkoxycarbonyl or alkoxycarbonyloxy, and $X^6$ can be optionally substituted phenyl, and also (b) 1-aminonaphthalines or general formula IV

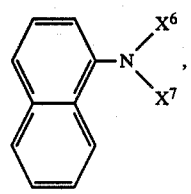
(IV)

(c) carbazoles of the general formula V

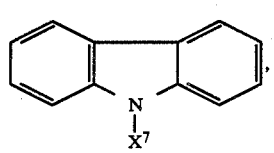
(V)

(d) 2.6-diamino-3-cyano-4-methylpyridines of the general formula VI

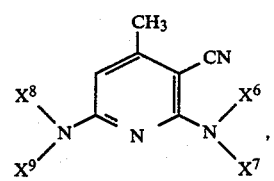
(VI)

(e) 2-aminothiazoles of the general formula VII

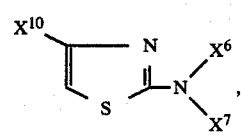
(VII)

(f) 2-aminothiophenes of general formula VIII

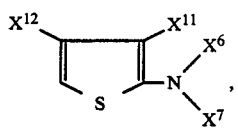
(VIII)

(g) 2-aminopyridines of the general formula IX or X

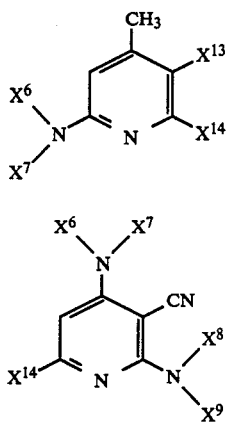

(h) aminopyrazoles of the general formula XI

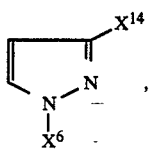

(i) aminoquinolines of the general formula XII

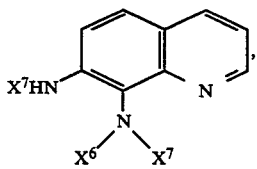

(k) hydroxypyridones of the general formula XIII

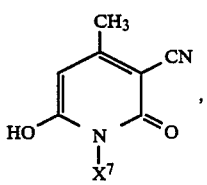

(l) pyrazolones of the general formula XIV

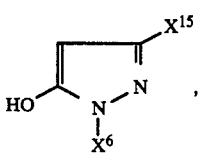

(m) hydroxyquinolones of the general formula XV

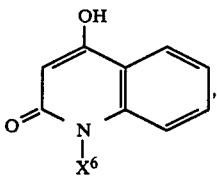

(n) phenol, o-cresol, 2-naphthol, 2-naphthol-6-sulphonic acid (N-hydroxyethyl-N-methyl)-amide or 2-naphthol-6-sulphonic acid (N-acetoxyethyl-N-methyl)-amide, in which connection, in the general formulae III to VIII $X^6$ and $X^7$ have the meanings mentioned above, $X^8$ and $X^9$ independently thereof can have the meanings of $X^6$ and $X^7$ and $X^{10}$ denotes hydrogen, alkyl, phenyl or heteralaryl, $X^{11}$ denotes hydrogen, alkyl or phenyl, $X^{12}$ denotes hydrogen, cyano, alkoxycarbonyl or alkylsulphonyl, $X^{13}$ denotes cyano, nitro, optionally substituted aminocarbonyl or hydrogen, $X^{14}$ denotes $NX^6X^7$ or optionally substituted alkoxy or alkylthio, and $X^{15}$ denotes methyl or aminocarbonyl.

In the aqueous acid medium, such as is present in the coupling reaction, the carboxylic acid esters to be employed in accordance with the invention are saponified partially or completely to give water-soluble products in the course of the coupling reaction, so that the initially two-phase liquid system changes into a single-phase system. The amounts mentioned of 0.3 to 150% by weight, preferably 0.5 to 50% by weight and very particularly preferably 1 to 15% by weight, of carboxylic acid ester to be employed, relative to the amount of the dyestuff synthesized, calculated on a dry basis, therefore relate to the state before or at the start of the coupling reaction. Water is introduced into the coupling mixture by the coupling solution or dispersion and, in some cases, by the diazo solution or dispersion. As a result of this and as the result of possible addition of ice for cooling and/or aqueous alkali hydroxide solution for controlling the pH, it is possible for the volume of liquid in the batch to increase towards the end of the coupling reaction to, for example, 10 to 50 times the volume of the coupling solution or dispersion before the coupling reaction. Relative to the total amount of water present in the reaction when coupling is complete, only about 0.03 to 15% by weight, in many cases 0.03 to 5% by weight, of carboxylic acid ester are required in the process according to the invention, and this ester is in a substantially or completely saponified form when the coupling is complete. It was surprising that such small amounts of carboxylic ester exhibit any effect at all.

The result of the process according to the invention is to produce a considerable improvement in the crystallinity of the dyestuff prepared, which has, for example, an extremely advantageous effect on the behaviour of the dyestuff when filtered off.

The disperse azo dyestuff precipitated after coupling in the process according to the invention can be isolated immediately by filtration and washing until neutral, without additional heat treatment. The filtering and washing times are considerably shortened by the process according to the invention. In addition, the paste content (that is to say solids content) of the filter cake present after being filtered off and rinsed is increased considerably.

Additionally, a colour-stable crystal modification of the dyestuff is in some cases formed without further treatment in the process according to the invention. Hitherto it has been necessary to subject the dyestuff to a subsequent stabilization operation, for example by heating, in order to convert a colour-unstable crystal modification into a colour-stable crystal modification.

The percentages quoted in the following examples are percentages by weight.

EXAMPLE 1

217.5 g of dry 2-chloro-4,6-dinitroaniline are dissolved in 500 g of 95% strength sulphuric acid and are diazotized at 25° to 40° C. with 313 g of 42% strength nitrosylsulphuric acid. A clear diazo solution is obtained in this way after stirring for several further hours. The coupler solution is prepared as follows: 280 g of 4-acetamino-2-amino-methoxyethoxybenzene are dissolved in 250 ml of water at 55°–60° C. and are ethylated with 202 g of diethyl sulphate at this temperature for 2 hours. As soon as the pH value has fallen, in the course of this reaction, to a value of approx. 2.2 as a result of the ethylsulphuric acid formed, it is kept at this value by simultaneously adding 27% strength sodium hydroxide solution during the further progress of the reaction. The solution thus obtained is then cooled to 10°–15° C., and 5 g of sulphamic acid, 15 g of a commercially available graft polymer based on polypropylene glycol and ethylene oxide (ethylene oxide content 40%) and 35 g of butyl acetate are added successively.

The above diazo solution is then run into this coupler solution at 10°–15° C. in the course of 2 hours, the heat evolved being absorbed by the addition, at a uniform rate of approx. 1500 g of ice. When the addition of the diazo solution is complete, the product is immediately filtered off with solution via a porcelain suction filter of diameter of 34 cm equipped with a cloth filter. The suction time is approx. 5 minutes. The filter cake is washed into a neutral state within approx. 45 minutes. Its paste content, after air-blowing, is approx. 50%.

Drying in vacuo gives approx. 450 g of a dyestuff of the formula

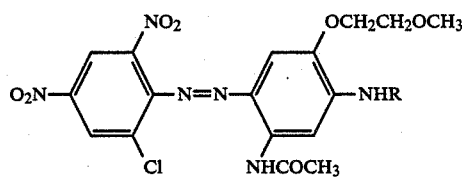

R is ~75% C$_2$H$_5$ and ~25% H, which dyes polyester in navy blue colour shades.

If the same coupling reaction is carried out without adding butyl acetate, the suction time is several hours, washing the filter cake takes 1–2 days and the paste content is 10%. Since the dyestuff is exposed to sulphuric acid for a longer time during filtration, the dyestuff yield falls by approx. 15%.

EXAMPLE 2

26.6 g of 2-ethylamino-4-propionylamino-methoxyethoxybenzene are dissolved in 50 ml of water by adding 8 g of 95% strength sulphuric acid, and 0.4 g of sulphamic acid, 0.2 g of a ligninsulphonate and 5 g of ethyl acetate are added. A diazo solution which has been prepared analogously to Example 1 from 21.75 g of anhydrous 2-chloro-4,6-dinitroaniline is coupled with this coupler solution at 10°–15° C. in the course of 2 hours, while 150 g of ice are added. The dyestuff formed is filtered off with suction immediately (suction time 3 minutes using a porcelain suction filter of diameter 16 cm), washed with cold water for 30 minutes until pH 3 is reached and then washed with warm water at about 50° C. and dried by air-blowing. 101 g of a 45% strength paste are obtained in this manner, and drying in vacuo at 50° C. gives therefrom 45.5 g (92% of theory) of a dyestuff of the formula

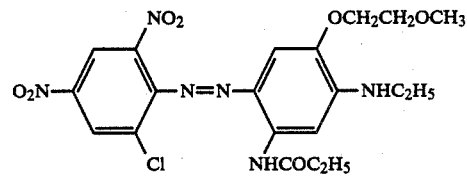

which dyes polyester in navy blue shades.

EXAMPLE 3

262 g of anhydrous 2-bromo-4,6-dinitroaniline are introduced, in the course of 30 minutes, into 570 g of 95% strength sulphuric acid and are dissolved completely by subsequent stirring, and are diazotized at 20° to 25° C. in the course of 1 hour by means of 333.6 g of 40% nitrosylsulphuric acid. A clear diazo solution is obtained in this way after stirring for a further 2 hours. Meanwhile 216.6 g of N-acetyl-N',N'-diethyl-1,3-phenylenediamine are dissolved in 1000 ml of water at 10°–15° C. by adding 75 g of 95% strength sulphuric acid, and 12 g of sulphamic acid, 15 g of a commercially available graft polymer obtained from polypropylene glycol and ethylene oxide (ethylene oxide content 40%) and 30 g of butyl acetate are added to the solution. The diazo solution described above is then added at 10°–15° C. in the course of 2 hours, the temperature being maintained by adding 1350 g of ice. The product is then filtered off with suction via a porcelain suction filter of diameter 29 cm (suction time 5 minutes), washed with 4 l of cold water at pH 3 and then with a little hot water at 80° C. and dried by air-blowing. This gives: 1061 g of a paste having a paste content of 43%, corresponding to 456 g (90% of theory) of a dyestuff of the formula

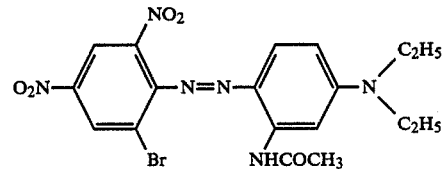

which dyes polyester in reddish-tinged blue shades.

EXAMPLE 4

104 g of 2-amino-6-thiocyanatobenzothiazole are dissolved at 15° to 20° C. in 1300 g of 50% strength sulphuric acid and are diazotized, at −5° to −10° C. with 162 g of 42% strength nitrosylsulphuric acid in the course of ½ hour. The diazo solution thus obtained is coupled, at 10° to 15° C. and in the course of 90 minutes, with a solution of 146 g of N,N-diacetoxyethyl-m-toluidine, 1500 ml of water, 62 g of 95% strength sulphuric acid and 5 g of sulphamic acid, to which 25 g of butyl acetate are added shortly before coupling begins. As soon as the pH in the coupling suspension has reached a value of 0.2, the pH is kept at a value of 2 to 4 by adding 27% strength sodium hydroxide solution, and the heat evolved is absorbed by adding a total of approx. 1300 g of ice. The mixture is stirred for a further hour and the product is filtered off via a porcelain suction filter of diameter 29 cm (suction time 2 minutes), washed with water until it is neutral and free from salts, and dried by airblowing. This gives 321 g of a 68.5% strength paste containing 220 g (88.5% of theory) of a dyestuff of the formula gives: 422 g of a 45% strength paste, corresponding to 190 g (95% of theory) of a dyestuff of the formula

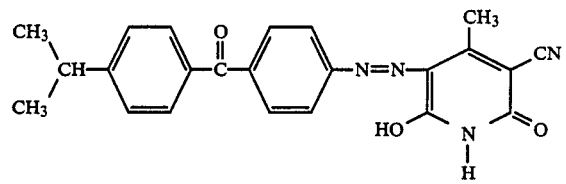

which dyes polyester in yellow shades.

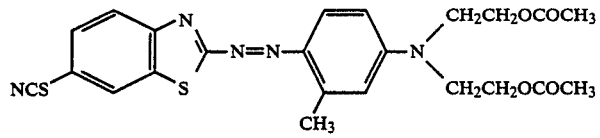

which dyes polyester in red shades.

EXAMPLE 5

163 g of 2-cyano-4-nitraniline are dissolved in 1050 g of 80% strength sulphuric acid at 5°–10° C. and are diazotized at this temperature by adding 326 g of 42% strength nitrosylsulphuric acid in the course of 1 hour. Stirring for approx. a further 2 hours gives a clear diazo solution, which is poured onto 1750 g of ice, whereupon a clear solution results once again. 40 g of butylacetate are added to this solution at 10°–15° C., and a suspension of 250 g of N-phenethyl-N-cyanoethylaniline and 750 g of water, previously finely dispersed by means of a pinned disc mill, is pumped in. The batch is stirred further at a rising temperature until the coupling reaction is complete. The product is then filtered off with suction via a porcelain suction filter of diameter 29 cm (suction time 4 minutes), and the filter cake is washed with water until it is neutral. This gives 610 g of a 60% strength paste containing 366 g (86% of theory) of a dyestuff of the formula

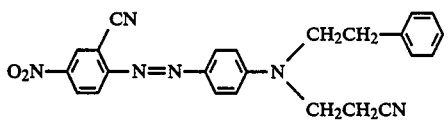

which dyes polyester in red shades.

EXAMPLE 6

A finely dispersed suspension of 120 g of 4-amino-4'-isopropylbenzophenone in 1000 ml of 13% strength hydrochloric acid is diazotized at 5° to 10° C. with 73 ml of a 40% strength solution of sodium nitrite, and clarified by filtration over kieselguhr, which is rinsed with 100 ml of water. This diazo solution is added at 20° C. and in the course of 2 hours to a coupler solution containing 800 ml of water, 85 ml of 27% strength sodium hydroxide solution, 75 g of 3-cyano-4-methyl-2-hydroxy-6-pyridone, 12 g of butyl acetate and 6 g of a block polymer formed from polypropylene glycol and ethylene oxide. Stirring is continued for 30 minutes to complete the reaction and the product is filtered off (suction time via a porcelain suction filter diameter 19 cm: 1 minute), washed until it is neutral and free from salts with 3 l of water and dried by air-blowing. This According to radiographic analysis using Cu-Kα-radiation, the dyestuff is in the form of a colour-stable crystal modification.

The process described is repeated, dispensing with the added butyl acetate. The suction time is now 35 minutes, the solids content of the suction filter cake is 21% and the yield amounts to 95% of theory. According to radiographic analysis (Cu-Kα-radiation), the dyestuff thus obtained is in the form of the colour-unstable α-modification.

EXAMPLE 7

173 g of 2-chloro-4-nitroaniline are dissolved by stirring in 400 g of concentrated sulphuric acid and are diazotized at 20° to 30° C. with 326 g of 40% strength nitrosylsulphuric acid. The diazo solution thus obtained is coupled, at 20° to 25° C. and in the course of 2 hours, with direct cooling by means of 1500 g of ice, with a finely dispersed suspension of 250 g of N-phenethyl-N-cyanoethylaniline and 10 g of a ligninsulphonate in 750 ml of water, to which 20 g of butyl acetate are added shortly before the coupling reaction. Coupling of the batch is complete after stirring for approx. 3 further hours. The product is filtered off with suction via a porcelain suction filter of diameter 29 cm (suction time: 1 minute) and is washed with water until it is neutral and dried by air-blowing. This gives: 685 g of a 62% strength paste corresponding to 425 g (97.7% of theory) of a dyestuff of the formula

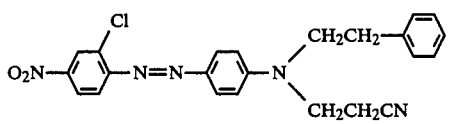

which dyes polyester in scarlet-red shades.

EXAMPLE 8

(a) 249 g of phenyl 3'-aminobenzenesulphonate in the form of moist, technical product, are made into a fine suspension in 1300 ml of water, 700 ml of 30% strength hydrochloric acid are added, and the mixture is diazotized in the course of 1 hour and at 10° to 15° C., by adding 140 ml of 40% strength sodium nitrite solution dropwise. The mixture is left for 1 hour and is filtered over kieselguhr, which is rinsed with 500 ml of ice water. The resulting diazonium salt solution is added, in the course of 60 minutes and at 25° to 30° C., to a coupler solution containing 1500 ml of water, 78 ml of 50% strength sodium hydroxide solution, 164 g of 3-cyano-1,4-dimethyl-2-hydroxy-6-pyridone, 12 g of n-butyl acetate and 10 g of a ligninsulphonate. Stirring is continued for 30 minutes in order to complete the reaction, and the product is filtered off (suction time via a porcelain suction filter of diameter 10 cm: 3 minutes) washed with water until it is neutral and free from coupler, and dried by air-blowing. This gives 1094.5 g of a paste having a solids content of 38%, corresponding to 415.9 g (98% of theory) of the dyestuff of formula

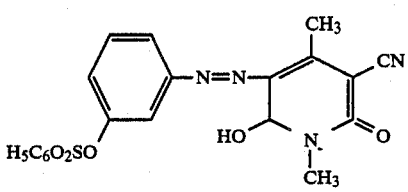

which melts at 203°-204° C. and dyes polyester in yellow shades. The dyestuff is in the form of a colour-stable crystal modification (β-modification) having an X-ray defraction diagram (Cu-Kα-radiation) with the following lines of strong intensity at diffraction angles of $2\theta(°)$ of 14.23, 21.40 and 27.37, lines of medium intensity at diffraction angles $2\theta(°)$ of 9.66, 11.54, 14.90, 15.56, 18.83, 20.05, 22.68 and 24.61 and lines of low intensity at diffraction angles $2\theta(°)$ of 7.51, 12.85, 16.21, 26.20, 28.46, 31.02 and 32.02.

(b) In a repetition of Example 8 (a), 12.5 g of a tributylphenol polyglycol ether having an average chain length of the polyglycol radical of 13 is added to the coupler solution instead of the ligninsulphonate. The reaction temperature in the coupling reaction is 40° to 45° C. The suction time is 2 minutes, the solids content of the filter cake is 40% and the yield is 98% of theory. The melting point is 203° to 204° C.

The dyestuff is in the form of a colour-stable modification (γ-modification) having the following lines of strong intensity in the X-ray diffraction diagram (Cu-Kα-radiation) at diffraction angles $2\theta(°)$ of 13.32, 24.86 and 26.78, lines of medium intensity at 6.68, 14.27, 15.36 and 21.11 and lines of low intensity at 11.61, 12.06, 18.74, 29.12 and 31.76.

(c) In a repetition of example 8 b, 18 g of ethyl acetate are added to the coupler solution instead of the butyl acetate and 12.5 g of a block polymer based on polypropylene glycol and ethylene oxide (ethylene oxide content: 40%) are added instead of the tributylphenyl polyglycol ether. The process is similar to Example 8 b in suction time, solids content and yield. According to radiographic analysis, the dyestuff (melting point 203° to 204° C.) is in the form of a mixture of the two colour-stable modifications β- and γ- described above.

(d) If Example 8 a is repeated without the carboxylic acid ester, the suction time is 18 minutes, the solids content is 24% and the yield is 98% of theory. The melting point is 203° to 204° C. The dyestuff thus obtained is in the form of a colour-unstable modification (α-modification) having the following lines of strong intensity in an X-ray diffraction diagram (Cu-Kα-radiation) at diffraction angles of $2\theta(°)$ of 11.23 and 22.60 and lines of low intensity at $2\theta(°)$ of 9.47, 13.87, 14.85, 17.21, 18.80, 23.57, 25.47 and 28.56.

(e) The colour-stable modifications β- and γ- which have been described can also be obtained by heating aqueous suspensions, if appropriate in the presence of surface-active substances, such as are described, for example, on pages 10 and 11, or by crystallization from organic solvents, such as, for example, ethanol, butanol or toluene.

The dyestuffs obtained in Example 8 a–d can be processed in accordance with known methods to give dispersions or powders suitable for dyeing, for example by finely dispersing their aqueous suspensions in the presence of dispersing agents, such as, for example, ligninsulphonates or condensation products formed from an alkylphenol, formaldehyde and sulphuric acid, by means of bead mills, ball mills and sand mills and, if appropriate, subsequent spray drying.

The dyestuffs which have been prepared by processes of Examples 8 a, b and c and subsequently finished do not flocculate in an aqueous medium under dyeing conditions, which is particularly important for dyeing round packages, for example cheeses, and, in the generally known dyeing tests, such as the heat stability test, the filter flow test and the test for stability on storage at room temperature and at 50° C., display better results than the dystuff preparations obtained from the colour-unstable modification according to Example 8 d.

EXAMPLE 9

If Example 3 is repeated, but using other carboxylic acid esters instead of butyl acetate, the results listed in the following tables are obtained.

| Carboxylic acid ester | Amount (g) | Suction time (minutes) | Solids content (%) | Yield (% of theory) |
|---|---|---|---|---|
| sec.-butyl acetate | 20 | 5 | 43 | 93 |
| tert.butyl acetate | 20 | 5 | 46 | 93 |
| n/i-pentyl acetate* | 30 | 7 | 47 | 93 |
| benzyl acetate | 20 | 7 | 42 | 92 |
| 3-methoxy-n-butyl acetate | 40 | 10 | 40 | 89 |
| isopropenyl acetate | 30 | 5 | 41 | 92 |
| diethyl succinate | 20 | 10 | 40 | 92 |
| ethyl phenyl acetate | 10 | 12 | 37 | 90 |
| n-butyl glycollate | 30 | 10 | 38 | 88 |

*(commercial mixture of n-pentyl and i-pentyl acetates)

What is claimed is:

1. Process for the preparation of azo disperse dyestuffs by diazotization and coupling in an aqueous phase, characterized in that the coupling is carried out in the presence of 0.03 to 15% by weight, relative to the total amount of water present in the reaction mixture when coupling is complete, of an ester of the formula

wherein
R denotes H; —(CH$_2$)$_n$—CO—OR$^2$; alkyl having 1 to 5 carbon atoms; or alkyl having 1 to 5 carbon atoms and substituted by OR$^3$, —COOR$^2$, O—CO—R$^3$, —C$_6$H$_5$, —OC$_6$H$_5$ or —OH;
R$^1$ and R$^2$ denote

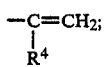

alkyl having 1 to 8 carbon atoms; or alkyl having 1 to 8 carbon atoms and substituted by —OR$^4$ —COOR$^4$, —O—CO—R$^4$, —C$_6$H$_5$, —OC$_6$H$_5$, —O—(CH$_2$)$_m$—OR$^4$ or —OH;

R$^3$ and R$^4$ denote alkyl which has 1 to 8 carbon atoms;

n denotes 0 to 4, and m denotes 1 to 4.

2. Process according to claim 1, characterized in that the coupling is carried out in the presence of 0.03 to 5% by weight of the ester, relative to the total amount of water present in the reaction mixture when coupling is complete.

3. Process according to claim 1, characterized in that, in the coupling reaction, a solution or dispersion of a diazonium salt is introduced into a solution or dispersion of the coupling component.

4. Process according to claim 1, characterized in that the coupling is carried out at temperatures from −10° to 80° C.

5. Process according to claim 1, characterized in that the coupling is carried out at temperatures from 0° to 60° C.

6. Process according to claim 1, characterized in that the coupling is carried out at temperatures from 0° to 30° C.

7. Process according to claim 1, characterized in that the ester is added to a solution or dispersion of the coupling component before the coupling reaction.

8. Process according to claim 1, characterized in that the coupling is carried out in the presence of an ester of the formula I $$R—CO—OR^1 \quad\quad (I)$$

wherein

R denotes H; alkyl having 1 to 5 carbon atoms; or —(CH$_2$)$_n$CO—OR$^2$,

R$^1$ and R$^2$ denote alkyl having 1 to 8 carbon atoms and n denotes 0 to 4.

* * * * *